(12) United States Patent
Sun et al.

(10) Patent No.: US 8,462,713 B2
(45) Date of Patent: Jun. 11, 2013

(54) APPARATUS AND METHOD FOR TRANSMITTING FAST FEEDBACK DATA IN WIRELESS SYSTEMS

(75) Inventors: Hongmei Sun, Beijing (CN); Qinghua Li, San Ramon, CA (US); Xintian E. Lin, Palo Alto, CA (US); Yuan Zhu, Beijing (CN); Changlong Xu, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 12/658,337

(22) Filed: Feb. 8, 2010

(65) Prior Publication Data

US 2011/0075619 A1    Mar. 31, 2011

Related U.S. Application Data

(60) Provisional application No. 61/277,533, filed on Sep. 25, 2009.

(51) Int. Cl.
*H04W 4/00* (2009.01)

(52) U.S. Cl.
USPC .......................................... 370/329; 370/330

(58) Field of Classification Search
USPC ................................ 370/329, 330
See application file for complete search history.

(56) References Cited

U.S. PATENT DOCUMENTS

| | | | |
|---|---|---|---|
| 2008/0225792 A1* | 9/2008 | Naguib et al. | 370/330 |
| 2009/0201871 A1* | 8/2009 | Sambhwani et al. | 370/329 |
| 2010/0208669 A1* | 8/2010 | Chun et al. | 370/329 |
| 2010/0272042 A1* | 10/2010 | Chun et al. | 370/329 |

\* cited by examiner

*Primary Examiner* — Mark Rinehart
*Assistant Examiner* — Angel Brockman
(74) *Attorney, Agent, or Firm* — Schwegman, Lundberg & Woessner, P.A.

(57) ABSTRACT

Embodiments of the present invention may help facilitate improved performance for high throughput, mobile wireless networks, e.g., IEEE 802.16m, mobile implementations for 3GPP Long Term Evolution (LTE) including LTE advanced mobile phone networks, and other types of high bandwidth networks. In some embodiments, provided are orthogonal sequences with desirable correlation properties for, e.g., 4-6 bits of information, among other things, typically achieving improved performance at varied vehicle speeds. In some embodiments, correlation distances for 6 bits may be less than 3.86, for 5 bits may be less than 3.12, and for 4 bits may be less than 1.95. Additionally, in some embodiments, dedicated coding for PFBCH information may be provided to achieve improved performance for most (if not all) information bits at a relatively wide range of vehicle speeds. Different code sequences for different tiles in one PFBCH channel may be applied for same messages to overcome error floors in high speed scenarios.

3 Claims, 6 Drawing Sheets

| N | S0 | S1 | S2 | S3 | S4 | S5 | S6 | S7 | S8 | S9 | S10 | S11 |
|---|---|---|---|---|---|---|---|---|---|---|---|---|
| 0 | 0.1+0.09i | 0.09-0.23i | -0.18+0.32i | 0.05+0.24i | 0.07+0.1i | 0.12+0.08i | 0.21+0.34i | -0.31-0.26i | 0.09-0.25i | -0.27-0.2i | 0.23+0.21i | 0.31-0.05i |
| 1 | -0.17-0.2i | -0.18+0.18i | -0.22-0.1i | -0.31-0.01i | 0.13-0.33i | 0.25-0.19i | 0.16+0.1i | 0.3+0.3i | 0.11+0.12i | 0.23-0.15i | -0.35+0.11i | 0.14-0.1i |
| 2 | -0.01-0.38i | 0.06+0i | -0.05-0.29i | 0.05+0i | -0.22+0.29i | -0.02-0.13i | 0.39-0.07i | -0.23+0.15i | 0.24-0.06i | -0.37-0.09i | -0.02+0.29i | 0.26-0.12i |
| 3 | -0.27-0.27i | 0.24+0.32i | -0.03-0.37i | 0.37+0.12i | -0.22-0.17i | 0.15-0.36i | 0.12-0.1i | 0.05+0.1i | 0.03+0i | 0.14-0.17i | -0.19+0.19i | -0.14-0.03i |
| 4 | -0.27-0.24i | -0.15-0.19i | -0.01-0.02i | -0.17-0.22i | -0.19+0.24i | 0.17-0.33i | 0.27+0.19i | 0.13-0.04i | -0.07+0.03i | -0.15-0.39i | 0.09+0.36i | -0.22+0.07i |
| 5 | -0.15-0.05i | -0.19-0.27i | -0.01+0.37i | 0.39-0.04i | 0.14-0.04i | 0.15+0.33i | 0.24-0.21i | 0.08-0.11i | -0.03+0.21i | 0.24+0.32i | -0.21-0.03i | -0.14-0.2i |
| 6 | -0.04+0.16i | -0.41+0.1i | 0.15+0.19i | -0.01+0.32i | -0.06+0.22i | 0.19-0.26i | 0.2+0.03i | 0.07-0.26i | 0.24+0.33i | 0.18-0.21i | 0.04+0.1i | 0.11+0.3i |
| 7 | -0.1-0.22i | 0.36-0.12i | -0.4-0.01i | 0.29-0.23i | -0.11-0.4i | -0.09-0.06i | -0.14+0.19i | -0.13+0.1i | -0.17-0.16i | 0.34+0.05i | 0.13-0.09i | 0.16+0.11i |
| 8 | -0.22+0.13i | -0.08-0.02i | -0.26-0.15i | 0.41+0.05i | 0.07-0.03i | 0.13-0.29i | 0+0.33i | -0.27-0.2i | -0.26-0.08i | -0.32+0.07i | 0.11-0.26i | -0.22-0.2i |
| 9 | -0.23-0.17i | 0.21+0.21i | -0.08-0.2i | -0.02-0.33i | 0.05+0.22i | 0.35-0.15i | -0.19+0.38i | -0.31-0.04i | 0.07-0.19i | 0.09+0.16i | -0.26+0.06i | 0.08+0.2i |
| 10 | -0.3-0.1i | -0+0.05i | -0.21+0.12i | 0.36+0.19i | -0.29-0.05i | 0.25-0.19i | 0.28+0.17i | -0.4+0.07i | 0.12-0.02i | 0.17+0.14i | 0.05+0.3i | -0.07-0.26i |
| 11 | -0.27-0.27i | -0.12-0.07i | 0.23+0.25i | 0.2+0.03i | -0.34-0.18i | 0.32+0.13i | -0.22-0.11i | -0.09-0.22i | -0.17-0.24i | -0.02-0.29i | 0.2+0.13i | -0.09-0.24i |
| 12 | 0.2+0.04i | -0.16-0.07i | -0.08-0.29i | -0.13+0.15i | -0.12+0i | 0.26-0.22i | -0.16+0.27i | -0.35+0.19i | 0.26-0.18i | 0.35-0.03i | 0.19-0.02i | 0.33-0.22i |
| 13 | -0.33-0.06i | 0.01+0.3i | -0.09+0.33i | -0.01-0.25i | 0.16+0.28i | 0.17-0.17i | 0.21+0.26i | -0.07-0.09i | -0.04+0.08i | -0.14+0.16i | -0.14-0.38i | -0.25-0.23i |
| 14 | -0.15-0.05i | 0.16+0.18i | -0.15+0.15i | 0.25-0.31i | -0.24-0.01i | -0.16+0.39i | 0.19-0.23i | -0.27-0.03i | -0.15-0.33i | -0.21+0.09i | -0.03-0.1i | -0.33-0.07i |
| 15 | -0.05-0.41i | 0.11+0.31i | -0.05+0.07i | 0.35-0.26i | -0.38-0.05i | -0.04-0.34i | -0.02+0.3i | 0.02-0.18i | 0.19-0.21i | -0.08-0.08i | -0.03+0.06i | 0.16+0.09i |
| 16 | -0.23-0.09i | -0.36-0.12i | 0.05-0.37i | -0+0.17i | -0.3-0.16i | 0.26-0.07i | -0.1-0.14i | -0.13-0.03i | -0.25+0.25i | 0.14-0.16i | 0.22+0.29i | -0.12-0.26i |
| 17 | -0.14+0.3i | 0.22-0.12i | -0.34+0.02i | -0.16-0.02i | 0.01-0.34i | 0.12+0.29i | 0.06-0.16i | -0.06-0.32i | 0.2+0.2i | 0.27-0.03i | -0.12-0.34i | -0.21+0.07i |
| 18 | 0.05-0.33i | -0.33-0.06i | 0+0.24i | 0.14+0i | 0.07+0.17i | 0.19-0.38i | -0.25-0.21i | 0.22+0.26i | -0.32-0.22i | 0.04-0.03i | 0.19+0.04i | -0.22-0.07i |
| 19 | -0.13-0.32i | 0.1-0.27i | -0.25-0.17i | 0.23-0.04i | -0.36-0.12i | 0.13-0.12i | -0.36-0.13i | 0.16+0.2i | 0.08-0.09i | -0.12+0.24i | 0.31-0.03i | 0.05+0.28i |
| 20 | -0.07-0.2i | 0.2+0.31i | 0.03+0.41i | -0.19-0.04i | 0.02-0.14i | -0-0.12i | -0.19+0.1i | -0.24-0.07i | 0.01-0.36i | 0.37+0.1i | 0.23+0.25i | -0.21+0.18i |
| 21 | -0.06+0.1i | -0.32-0.17i | -0.31-0.08i | -0.25-0.17i | 0.21-0.2i | 0.28-0.14i | 0.33-0.02i | -0.16+0.36i | 0.2+0.11i | -0.37-0.08i | -0.09+0i | -0.06-0.07i |
| 22 | -0.3-0.11i | -0.3-0.19i | -0.04+0.09i | 0.02-0.18i | -0.23+0.16i | 0.04-0.27i | 0.11-0.31i | -0.23-0.25i | 0.24+0.05i | -0.16+0.22i | -0.35-0.01i | 0.3+0.08i |
| 23 | -0.23-0.07i | 0.03+0.05i | -0.04-0.12i | -0.04+0.32i | -0.24+0i | 0.06+0.02i | 0.24-0.14i | 0.11+0.33i | -0.03-0.2i | 0.28+0.16i | 0.09+0.14i | 0.25+0.27i |
| 24 | -0.35+0.03i | -0.1-0.41i | 0.1-0.3i | 0.05+0.25i | 0.19-0.23i | 0.06-0.02i | 0.17-0.15i | -0.31+0i | 0.23-0.02i | 0.16-0.03i | 0.19+0.29i | 0.18-0.23i |
| 25 | 0.21-0.2i | -0.39-0.05i | -0.11-0.04i | -0.12-0.17i | -0.28-0.02i | 0.37-0.06i | 0.1-0.01i | 0.02+0.19i | 0.17-0.32i | 0.05+0.33i | 0.03+0.2i | -0.34+0.19i |
| 26 | -0.27-0.26i | 0.21+0.07i | 0.28-0.07i | 0.16+0.22i | 0.09+0.15i | -0.04-0.04i | -0.08+0.27i | -0.16+0.06i | -0.14+0.37i | 0.17-0.22i | -0.04+0.39i | -0.27+0.21i |
| 27 | -0.27-0.22i | 0.22-0.2i | 0.14+0.02i | 0.28-0.05i | 0.06-0.15i | -0.09+0.32i | -0.19+0.14i | -0.02+0.42i | -0.06-0.13i | 0.06-0.27i | -0.33+0.01i | -0.07-0.33i |
| 28 | -0.09-0.08i | 0.29+0.06i | -0.13-0.33i | 0.18+0.29i | 0.22+0.26i | 0.01+0.06i | 0.24+0.19i | -0.35-0.23i | -0.26+0.13i | 0.03-0.32i | -0.11+0.1i | -0.06+0.22i |
| 29 | -0.04-0.28i | -0.02-0.23i | -0.32+0.22i | -0.03-0.03i | -0.16-0.3i | 0.26-0.17i | 0.08-0.06i | 0.14+0.19i | -0.04+0.25i | 0.29-0.15i | -0.13-0.32i | 0.1+0.37i |
| 30 | -0.26-0.05i | 0.43-0.06i | -0.24+0.35i | -0.03-0.41i | -0.18+0.02i | 0.09-0.13i | 0.17-0.27i | -0.21-0.05i | -0.04+0.29i | -0.2+0.12i | 0.15-0.01i | 0.02-0.18i |
| 31 | -0.23-0.22i | -0.19-0.05i | 0.13-0.03i | 0.05+0.35i | -0.09+0.2i | 0.05-0.29i | -0.06-0.3i | -0.31-0.14i | -0.17-0.14i | 0.18+0.27i | 0.38-0.21i | 0.18+0.04i |
| 32 | -0.13+0.01i | 0.32-0.07i | -0.3+0.04i | -0.22-0.02i | -0.15-0.32i | -0.09-0.13i | 0.24+0.11i | -0.29-0.24i | -0.04+0i | 0.31+0.04i | 0.16-0.35i | -0.09-0.35i |

| | | | | | | | | | | |
|---|---|---|---|---|---|---|---|---|---|---|
| 33 | -0.3+0.25i | -0.3-0.03i | -0.16-0.08i | 0.18+0.07i | 0.11+0.14i | 0.36-0.05i | -0.32+0.15i | 0.23-0.02i | 0.38+0.09i | -0.16-0.07i | 0.01+0.12i | -0.37+0.13i |
| 34 | 0.01+0.27i | -0.18-0.13i | -0.25-0.05i | 0.06+0.27i | 0.01+0i | 0.07+0.34i | -0.11-0.15i | -0.28+0.16i | -0.3+0.29i | -0.24+0.1i | 0.21+0.34i | 0.25+0.13i |
| 35 | -0.23-0.19i | -0.14+0.11i | -0.01-0.36i | 0.17-0.18i | 0.05+0.16i | -0.19-0.21i | 0.38-0.07i | 0.14-0.18i | 0.34-0.16i | 0.13-0.17i | -0.04+0.37i | -0.19+0.14i |
| 36 | 0.06-0.35i | -0.19+0.12i | 0.06+0.13i | 0.26-0.15i | -0.06+0.13i | 0.2+0.09i | 0.18+0.15i | 0.15-0.36i | 0.09-0.34i | 0.18+0.08i | -0.07+0.37i | 0.3-0.19i |
| 37 | 0.11-0.1i | 0.33-0.04i | 0.36+0.24i | 0.15+0.39i | -0.08-0.3i | 0.01+0.33i | 0.06+0.05i | -0.03-0.12i | 0.24+0.02i | 0.03-0.04i | 0.19-0.13i | 0.39+0.1i |
| 38 | -0.03-0.15i | 0.07+0.31i | -0.02-0.23i | 0.13+0.24i | -0.02+0.32i | 0.19-0.07i | -0.2-0.31i | -0.08-0.01i | 0.08-0.22i | 0.4+0.13i | -0.36-0.19i | 0+0.27i |
| 39 | 0.09-0.08i | -0.26-0.14i | -0.37-0.14i | 0.32-0.01i | -0.19-0.08i | 0.17-0.39i | -0.28-0.01i | -0.31-0.04i | 0.35-0.03i | -0.2-0.05i | -0.15-0.05i | 0.21-0.08i |
| 40 | 0.11+0.16i | 0.08+0.05i | -0.04+0.38i | -0.33-0.22i | -0.3+0.02i | 0.14+0.31i | 0.23+0.08i | 0.03+0.25i | -0.17-0.3i | -0.14+0.13i | -0.3+0.13i | 0.26-0.01i |
| 41 | -0.28+0.09i | 0.14-0.03i | 0.09+0.17i | -0.01+0.3i | 0.05+0.39i | -0.09+0.2i | -0.2+0.19i | 0.26+0.07i | 0.14-0.02i | -0.11+0.41i | 0.19+0.34i | 0.07+0.24i |
| 42 | -0.07-0.23i | 0.07-0.2i | -0.25+0.13i | 0.22+0.22i | -0.33+0.01i | 0.18+0.04i | 0.1-0.32i | 0.16-0.23i | -0.24-0.2i | 0.29-0.19i | 0.16-0.1i | -0.36-0.02i |
| 43 | 0.08+0.01i | 0.26-0.15i | 0.26-0.2i | 0.2-0.11i | -0.17-0.31i | 0.16+0i | 0.18+0.32i | 0.22+0.13i | 0.06+0.19i | 0.15+0.4i | 0.08+0.18i | -0.23+0.28i |
| 44 | -0.02-0.34i | 0.02+0.03i | 0.2+0.05i | 0.12+0.31i | 0.16+0.23i | 0.16+0.17i | 0.21-0.12i | -0.1+0.28i | -0.06+0.42i | -0.29+0.08i | 0.02-0.18i | -0.1+0.37i |
| 45 | -0.33-0.02i | -0.38+0.02i | -0.02+0.16i | 0.07+0.14i | 0.05-0.34i | -0.05-0.23i | 0.28-0.04i | -0.25-0.02i | -0.04-0.36i | 0.23-0.04i | -0.35-0.02i | 0.23+0.11i |
| 46 | 0.18+0.23i | -0.18+0.08i | 0.09+0.3i | 0.13+0.26i | -0.23+0.03i | -0.2+0.22i | 0.24+0.26i | -0.01+0.05i | 0.21-0.34i | 0.31-0.09i | 0.13-0.28i | -0.23-0.08i |
| 47 | -0.1+0.31i | 0.17+0.27i | 0.13-0.17i | -0.2+0.01i | -0.16-0.07i | 0.28-0.14i | 0.16+0.22i | -0.07+0.1i | -0.01-0.31i | -0.36-0.13i | 0.16+0.35i | -0.33-0.06i |
| 48 | 0.18-0.28i | -0.06-0.14i | -0.1-0.14i | 0.3-0.24i | 0.08-0.14i | 0.09+0.3i | 0.29+0.05i | 0.25+0.1i | 0.15+0.26i | 0.13-0.37i | 0.11+0.23i | -0.21-0.22i |
| 49 | 0.26-0.06i | -0.11+0.25i | 0.03+0.29i | 0.31-0.02i | -0.4-0.09i | 0.25-0.21i | 0.21-0.1i | -0.1-0.22i | -0.1+0.24i | -0.33-0.01i | 0.03+0.28i | -0.16+0.05i |
| 50 | 0.17-0.36i | 0.09-0.23i | -0.29+0.17i | 0.03+0.04i | 0.04+0.39i | 0.32-0.09i | -0.18-0.12i | -0.31-0.04i | 0.02+0.31i | 0.21+0.25i | -0.01+0.24i | -0.02-0.05i |
| 51 | 0.19-0.27i | -0.08+0.2i | -0.11+0.26i | 0.12-0.35i | -0.31-0.23i | -0.21-0.2i | -0.29-0.09i | -0.09-0.05i | 0.03-0.14i | 0.1-0.26i | 0.05+0.31i | 0.14+0.3i |
| 52 | -0.31-0.17i | -0.11-0.16i | 0.14-0.19i | 0.04-0.26i | 0.12-0.38i | 0.19+0.32i | 0.27+0.15i | -0.19-0.04i | 0.02+0.14i | -0.19+0.29i | 0.27-0.04i | 0.2+0.15i |
| 53 | 0.25+0.08i | 0.01+0.35i | -0.12-0.19i | 0.24+0.21i | -0.18+0.38i | -0.36+0i | -0.12+0.12i | -0.28+0.06i | -0.08-0.2i | -0.02-0.02i | 0.19+0.24i | 0.03+0.33i |
| 54 | 0.17-0.09i | -0.32+0.05i | -0.17-0.19i | 0.17-0.23i | 0.32+0.06i | 0.2-0.12i | 0.2+0.14i | -0.13-0.2i | 0+0.36i | 0.2+0.31i | -0.01-0.27i | 0.18+0.29i |
| 55 | 0.16-0.26i | -0.18-0.08i | 0.13+0.35i | -0.13+0.31i | -0.08+0.08i | -0.1-0.16i | 0.19-0.08i | -0.14-0.32i | 0.42+0.09i | 0.3-0.04i | -0.17-0.32i | -0.05+0.01i |
| 56 | -0.35-0.01i | 0.35-0.22i | -0.22-0.01i | 0.17+0.12i | 0.04+0.04i | 0.23+0.27i | 0.18+0.22i | -0.31-0.04i | 0.19-0.26i | -0.08+0.12i | -0.05-0.32i | -0.19+0.13i |
| 57 | 0.15-0.09i | 0.24-0.23i | -0.25-0.32i | 0.32+0.06i | -0.06-0.24i | 0-0.26i | 0.03+0.27i | 0.32-0.13i | 0.32+0.08i | 0.19+0.3i | 0.1+0.1i | -0.09-0.2i |
| 58 | 0.11+0.13i | 0.36-0.13i | -0+0.08i | 0.03+0.26i | -0.12-0.17i | 0.28-0.21i | 0.28+0.2i | -0.17-0.24i | 0.33-0.05i | 0.19-0.3i | -0.07-0.23i | -0.32-0.01i |
| 59 | -0.16+0.26i | 0.37+0.23i | 0-0.25i | 0.04+0.26i | -0.1-0.34i | -0.05-0.2i | 0.17+0.07i | -0.29-0.09i | -0.01-0.35i | 0.03-0.33i | -0.2+0.03i | 0.09-0.33i |
| 60 | -0.22+0.17i | -0.28-0.01i | -0.24-0.04i | 0.19+0.1i | -0.24+0.28i | -0.32-0.11i | 0.21-0.02i | -0.2-0.05i | 0.03+0.39i | 0.23-0.05i | -0.07-0.09i | -0.14-0.23i |
| 61 | 0.05-0.01i | 0.13-0.28i | -0.23-0.06i | 0.31-0.3i | -0.06-0.27i | -0.1-0.14i | 0.18-0.23i | -0-0.26i | -0.15-0.23i | 0.17-0.15i | 0.29-0.24i | 0.11-0.27i |
| 62 | -0.15-0.34i | 0.1+0.14i | 0.25+0.15i | 0.33-0.03i | 0.11-0.3i | -0.05-0.17i | -0.31+0.03i | -0.32+0.08i | -0.2+0.13i | 0.07+0.31i | 0.05-0.24i | 0.32-0.08i |
| 63 | 0.32-0.06i | 0.01+0.09i | -0.33-0.02i | 0.01-0.08i | -0.29-0.05i | 0.06-0.31i | -0.2-0.21i | 0.16-0.24i | -0.35-0.12i | 0.03-0.19i | -0.1-0.4i | 0.27+0.05i |

| N | S0 | S1 | S2 | S3 | S4 | S5 | S6 | S7 | S8 | S9 | S10 | S11 |
|---|---|---|---|---|---|---|---|---|---|---|---|---|
| 0 | -0.19-0.24i | 0.28-0.05i | 0.26+0.12i | 0.28-0.08i | 0.26-0.18i | 0.21+0.14i | 0.01-0.27i | -0.23+0.18i | -0.04-0.27i | 0.22-0.21i | 0.27-0.09i | 0.28+0.11i |
| 1 | 0.06+0.28i | -0.03-0.31i | -0.08+0.24i | 0.16+0.23i | 0.13-0.26i | -0.15+0.27i | -0.24+0.13i | 0.07+0.27i | 0.3-0.02i | 0.3-0.03i | -0.16-0.25i | 0.21+0.16i |
| 2 | -0.09-0.29i | -0.25-0.18i | 0.1+0.27i | -0.26-0.06i | 0.27+0.03i | -0.18-0.23i | -0.05-0.26i | -0.1-0.3i | 0.25-0.15i | -0.15-0.23i | 0.25-0.14i | 0.05-0.27i |
| 3 | -0.23-0.19i | -0.3-0.05i | -0.23+0.15i | 0.07-0.28i | -0.11-0.25i | 0.2-0.2i | 0.18-0.26i | -0.2+0.14i | -0.28-0.08i | 0.29+0.12i | -0.1+0.26i | -0.1+0.27i |
| 4 | 0.08+0.29i | 0.26-0.12i | 0.31+0.03i | 0.29+0.09i | -0.04+0.32i | -0.17-0.22i | 0.28+0.03i | -0.3+0.03i | -0.21-0.1i | -0.14-0.26i | -0.21+0.17i | 0.28+0.01i |
| 5 | -0.29+0.05i | -0.04+0.26i | -0.05-0.26i | 0.21-0.19i | -0+0.3i | 0.06+0.3i | 0.07-0.28i | 0.15-0.25i | 0.17-0.19i | 0.27-0.14i | 0.04-0.29i | -0.08-0.31i |
| 6 | 0.23-0.19i | 0.26-0.16i | 0.13+0.18i | 0.2+0.24i | -0.22+0.22i | 0.24+0.16i | -0.17-0.24i | 0.04+0.23i | -0.29+0.05i | -0.25-0.12i | 0.25-0.15i | -0.31+0.05i |
| 7 | 0.25+0.15i | 0.11+0.29i | 0.12-0.27i | -0.02-0.28i | 0.25-0.17i | 0.15-0.23i | 0.25+0.13i | -0.02-0.3i | 0.07-0.28i | 0.26+0.1i | 0.26-0.07i | -0.29-0.1i |
| 8 | 0.27-0.03i | 0.08+0.3i | -0.24+0.17i | 0.24-0.15i | 0.08-0.23i | 0.16+0.23i | -0.28+0.07i | -0.02-0.3i | -0.16+0.24i | -0.19-0.2i | 0.29-0.08i | 0.3-0.07i |
| 9 | -0.07-0.31i | 0.17-0.23i | 0.09-0.3i | -0.21-0.19i | 0.04+0.26i | -0.11+0.28i | 0.22+0.2i | -0.2+0.22i | -0.08+0.26i | 0.04-0.27i | -0.12-0.24i | 0.26+0.14i |
| 10 | -0.22-0.06i | 0.24+0.18i | 0.28-0.04i | -0.28+0.1i | 0.29+0.03i | 0.29+0.01i | -0.23-0.1i | 0.3-0.1i | -0.22-0.21i | -0.03-0.31i | 0.09+0.28i | 0.23+0.17i |
| 11 | 0.18-0.23i | 0.15+0.27i | 0.31-0.02i | -0.07-0.27i | -0.04-0.3i | 0.29-0.02i | -0.18-0.18i | 0.04+0.27i | 0.15+0.25i | 0.29-0.03i | -0.2+0.23i | -0.03-0.27i |
| 12 | -0.15-0.28i | -0.04+0.3i | -0.15-0.2i | 0.22+0.11i | 0.26-0.2i | -0.05-0.26i | 0.27-0.13i | 0.29+0.05i | -0.13-0.26i | -0.28-0.08i | -0.09-0.25i | 0.3+0i |
| 13 | -0.01-0.32i | 0.28-0.06i | -0.11-0.29i | -0.04-0.25i | -0.16-0.25i | -0.26-0.15i | -0.3+0.03i | -0.27-0.05i | 0.1-0.25i | -0.14-0.23i | -0.08+0.25i | 0.28+0.12i |
| 14 | -0.27-0.14i | -0.15-0.22i | -0.08-0.29i | 0.22+0.21i | -0.23-0.22i | 0.29-0.01i | 0.21-0.19i | -0.28-0.05i | 0.24+0.11i | -0.3-0.1i | 0.25-0.01i | 0.12+0.24i |
| 15 | -0.07-0.28i | 0.27-0.07i | 0.14+0.27i | 0.05-0.29i | 0.08-0.26i | -0.1+0.25i | 0.27-0.13i | 0.25-0.17i | 0.21+0.21i | -0.28-0.06i | 0.23-0.08i | -0.24+0.18i |

FIG. 7

| N | S0 | S1 | S2 | S3 | S4 | S5 | S6 | S7 | S8 | S9 | S10 | S11 |
|---|---|---|---|---|---|---|---|---|---|---|---|---|
| 0 | 0.22-0.14i | 0.23+0.2i | -0.07+0.14i | 0.27-0.18i | -0.07+0.08i | -0.2-0.25i | 0.04-0.21i | 0.2-0.2i | 0.05-0.34i | 0.35+0.07i | 0.22-0.25i | 0.18+0.28i |
| 1 | -0.3+0.05i | 0.03+0.26i | -0.07-0.32i | 0-0.12i | 0.26-0.07i | 0.05-0.29i | -0.15+0.22i | 0.04+0.3i | 0.17-0.34i | 0.09-0.31i | -0.05-0.3i | 0.06-0.34i |
| 2 | 0.03-0.29i | -0.25-0.03i | -0.1-0.28i | 0.28-0.13i | -0.09+0.08i | 0.28+0.1i | 0.05-0.31i | 0.03-0.32i | -0.17-0.25i | 0.14-0.33i | 0.32+0i | -0.12-0.15i |
| 3 | -0.07-0.26i | 0.24+0.21i | -0.1-0.16i | -0.25+0.17i | 0.07+0.31i | 0.19+0.11i | -0.3-0.07i | 0.1-0.28i | 0.01-0.32i | -0.27-0.09i | 0.26-0.18i | 0.28-0.04i |
| 4 | 0.17-0.32i | -0.1+0i | 0.24-0.15i | 0.02+0.09i | 0.19-0.27i | -0.12+0.31i | 0.08+0.32i | -0.17-0.28i | -0.22-0.17i | -0.3+0.16i | -0.04-0.16i | 0.21+0.28i |
| 5 | -0.11+0.17i | 0.16+0.25i | -0.15-0.2i | 0.29-0.18i | 0.3-0.05i | 0.23-0.2i | -0.14-0.3i | 0.26+0.01i | -0.31-0.13i | -0.03-0.24i | 0.26-0.03i | -0.06-0.3i |
| 6 | -0.11-0.34i | 0.12+0.19i | -0.29-0.18i | -0.03+0.3i | -0.23-0.25i | -0.25-0.24i | 0.01-0.31i | 0.07+0.16i | 0.11-0.17i | -0.06-0.19i | 0.21+0.25i | -0.24-0.09i |
| 7 | 0.26-0.19i | 0.26-0.04i | -0.27-0.13i | 0.3-0.03i | -0.01-0.06i | 0.11+0.3i | 0.29-0.04i | 0.2-0.21i | 0.22-0.18i | -0.18-0.29i | -0.32-0.01i | 0.24+0.11i |
| 8 | -0.25+0.01i | -0.08-0.26i | -0.21-0.23i | -0.09-0.3i | 0.2-0.23i | 0.24+0.2i | -0.11+0.21i | 0.15+0.09i | -0.14-0.29i | -0.09+0.33i | 0.21-0.19i | -0.28+0.14i |
| 9 | -0.29-0.07i | 0.02+0.27i | -0.09-0.33i | 0.23-0.24i | 0.16-0.24i | -0-0.23i | 0.05-0.13i | -0.19+0.27i | 0.3-0.04i | 0.14+0.13i | 0.25-0.16i | -0.27+0.24i |
| 10 | 0.29-0.14i | 0.12-0.3i | -0.02-0.33i | 0.2-0.16i | -0.07-0.32i | 0.05-0.13i | 0.25-0.25i | 0.05-0.28i | 0.21+0.21i | -0.01+0.17i | 0.27+0.07i | -0.21-0.23i |
| 11 | -0.26-0.22i | -0.15-0.12i | 0.21-0.17i | 0.03-0.29i | -0.23-0.24i | -0.19-0.27i | 0.07-0.22i | 0.3-0.17i | -0.19+0.17i | -0.04+0.26i | -0.01+0.28i | 0.3-0.04i |
| 12 | -0.28-0.13i | 0.19-0.2i | 0.29-0.09i | 0.35-0.02i | -0.25-0.14i | -0.08+0.05i | 0.02-0.29i | -0.24-0.05i | 0.15-0.28i | 0.22+0.25i | 0.33-0.08i | 0.16-0.16i |
| 13 | -0.28-0.16i | -0.27-0.04i | -0.1+0.28i | -0.15-0.04i | 0.17+0.16i | -0.29+0.12i | 0.17-0.24i | 0.06-0.24i | 0.22-0.19i | 0.13+0.32i | 0.23+0.28i | -0.15-0.21i |
| 14 | -0.29-0.12i | 0.27+0.14i | 0.04+0.31i | 0.26+0.13i | -0.14-0.29i | 0.29+0.1i | -0.07-0.2i | -0.31-0.09i | -0.27-0.08i | 0.02-0.16i | -0.09+0.28i | -0.23-0.18i |
| 15 | 0.1-0.22i | -0.07-0.14i | 0.02-0.13i | 0.27-0.19i | 0.01-0.35i | 0.06+0.28i | -0.2-0.27i | 0.26-0.18i | -0.04+0.3i | -0.08+0.3i | 0.18-0.26i | -0.15-0.24i |
| 16 | 0.28-0.04i | -0.3+0.16i | -0.18-0.22i | 0.33-0.1i | -0.16-0.29i | 0.1+0.16i | -0.02-0.07i | -0.24-0.22i | -0.09-0.26i | -0.31-0.14i | -0.15-0.17i | -0.32-0.04i |
| 17 | 0.06+0.17i | 0.12-0.31i | -0.05-0.3i | -0.32-0.05i | 0.27-0.18i | 0.02+0.32i | 0.08-0.17i | 0.16-0.27i | 0.27-0.12i | -0.29-0.05i | 0.01+0.14i | 0.3+0.19i |
| 18 | -0.3+0.07i | -0.14+0.27i | 0.16-0.23i | 0.01+0.03i | -0.08+0.22i | -0.27-0.07i | -0.02-0.34i | -0.16-0.27i | -0.13-0.25i | -0.27-0.02i | 0.22-0.15i | 0.22+0.24i |
| 19 | 0.1+0.22i | 0.18-0.24i | 0.32+0.11i | 0.29+0.04i | 0.08+0.22i | 0.27-0.12i | 0.17-0.29i | -0.08-0.34i | 0-0.17i | -0.23-0.03i | 0.26-0.21i | -0.26-0.14i |
| 20 | -0.27-0.15i | 0.21-0.27i | 0.3-0.06i | -0.29-0.08i | -0.01-0.32i | 0.05-0.01i | 0.29-0.11i | 0.22-0.04i | -0.18-0.15i | 0.34+0i | 0.12+0.25i | -0.3-0.13i |
| 21 | -0.21-0.06i | -0.28-0.11i | 0.08+0.15i | 0.3-0.1i | 0.03-0.29i | -0.24+0.24i | 0.3-0.18i | 0.21+0.2i | -0.06-0.35i | -0.1-0.27i | 0.18+0.04i | 0.22-0.2i |
| 22 | 0.19-0.22i | 0.26-0.05i | -0.1-0.22i | -0.22+0.23i | 0.15-0.31i | -0.16-0.28i | 0.17-0.32i | -0.17-0.02i | -0.06-0.27i | 0.03+0.29i | -0.07-0.16i | 0.15+0.17i |
| 23 | -0.01+0.35i | -0.18-0.23i | -0.32-0.01i | 0.28-0.12i | 0.22+0.02i | 0.28+0.07i | -0.1-0.31i | -0.23-0.05i | -0.21-0.27i | 0.31+0.07i | -0.19+0.12i | 0.13+0.26i |
| 24 | 0.17-0.2i | 0.11-0.28i | 0.1+0.33i | -0.21-0.13i | 0.25-0.19i | 0.01+0.26i | 0.05+0.27i | 0.02-0.22i | 0.23-0.15i | 0.26-0.12i | 0.32-0.14i | -0.09+0.18i |
| 25 | 0.27-0.02i | -0.16+0.12i | -0.25+0.13i | -0.11+0.31i | -0.32-0.08i | 0.21+0.26i | -0.24-0.24i | -0.12+0.31i | -0.1+0.32i | 0.08+0.23i | 0.17-0.21i | 0.09-0.21i |
| 26 | 0.22-0.13i | -0.23-0.05i | 0.31+0.02i | -0.22-0.22i | -0.29-0.17i | 0.13-0.32i | 0.3-0.1i | 0.26-0.18i | -0.26+0.03i | -0+0.2i | -0.14+0.06i | -0.29-0.03i |
| 27 | 0.27-0.05i | 0.3+0.11i | 0.26-0.2i | 0.07+0.03i | -0.11-0.03i | -0.1+0.27i | -0.05-0.06i | -0.24-0.16i | -0.08-0.3i | 0.29+0.17i | -0.3+0.11i | -0.29+0.1i |
| 28 | -0.27-0.19i | -0.24-0.16i | -0.18-0.13i | 0.01-0.24i | 0.21-0.27i | -0.28-0.12i | -0.17-0.15i | 0.32-0.1i | 0.24-0.25i | 0.33-0.06i | 0.34-0.05i | -0.09-0.16i |
| 29 | -0.15+0.17i | -0.28-0.11i | -0.29-0.1i | 0.29+0.13i | 0.24+0.25i | -0.25-0.2i | -0.08-0.21i | 0.28-0.2i | 0.03+0.26i | 0.24-0.24i | -0.3+0.05i | 0.09+0.09i |
| 30 | 0.25-0.02i | 0.3-0.07i | -0.26-0.04i | -0.26-0.13i | -0.28-0.04i | -0.17-0.11i | 0.28+0.15i | -0.3-0.05i | -0.26+0.01i | -0.2-0.15i | 0.34+0.03i | 0.29-0.08i |
| 31 | 0.23+0.07i | -0.23-0.09i | -0.08-0.19i | 0.31+0.01i | 0.1+0.23i | -0.33+0.07i | 0.18-0.17i | 0.18+0.27i | -0.32-0.02i | -0.05-0.33i | -0.01+0.3i | -0.24-0.17i | -0.09-0.31i |

FIG. 8

APPARATUS AND METHOD FOR TRANSMITTING FAST FEEDBACK DATA IN WIRELESS SYSTEMS

This application claims the priority benefit of earlier filed provisional application No. 61/277,533, filed on Sep. 25, 2009.

BACKGROUND

The present invention relates generally to wireless devices and in particular, to messaging between base stations and mobile stations.

In wireless communication systems, downlink (DL) transmissions will typically support multiple modes. The ability to adaptively switch among the transmission modes according to a mobile stations (MS) channel and traffic conditions is desirable to optimize the DL performance to achieve required capacity targets. A fast feedback channel is used to feed back the data of channel quality indicator in an uplink (UL) transmission to support DL adaptation. Improvements in use of the fast feedback channels may be desired.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 6A and 6B show an example for a semi orthogonal sequence for 6 bits of information.

FIG. 7 is a table with values for an exemplary semi-orthogonal sequence for 4 bits of information.

FIG. 8 is a table with values for an exemplary semi-orthogonal sequence for 5 bits of information.

DETAILED DESCRIPTION

Embodiments of the present invention may help facilitate improved performance for high throughput, mobile wireless networks, e.g., IEEE 802.16m, mobile implementations for 3GPP Long Term Evolution (LTE) including LTE advanced mobile phone networks, and other types of high bandwidth networks. In some embodiments, provided are orthogonal sequences with desirable correlation properties for, e.g., 4-6 bits of information, among other things, typically achieving improved performance at varied vehicle speeds. In some embodiments, correlation distances for 6 bits may be less than 3.86, for 5 bits may be less than 3.12, and for 4 bits may be less than 1.95. Additionally, in some embodiments, dedicated coding for PFBCH information may be provided to achieve improved performance for most (if not all) information bits at a relatively wide range of vehicle speeds. Different code sequences for different tiles in one PFBCH channel may be applied for messages to overcome error floors in high speed scenarios.

Figure 1:
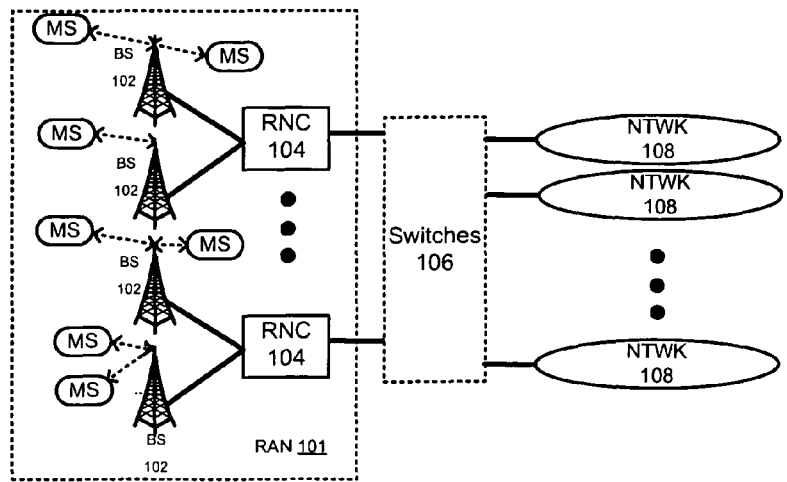
FIG. 1 is a diagram of a network system including a wireless access network in accordance with some embodiments.

FIG. 1 shows a simplified exemplary network with wireless access through a radio access network (RAN) 101. The RAN may be implemented as a homogeneous network, using a single wireless technology, or as a heterogeneous network, using a combination of different wireless technologies. The RAN typically allows mobile stations (MS) (also referred to as subscriber stations or mobile terminals) to access multiple different networks (NTWK) 108 via network switches 106. The networks 108 may comprise any networks including but not limited to voice and/or data networks such as the Internet (TCP/IP), the public switch telephone network (PSTN), other subscriber based voice/data networks, and others.

The switches 106 generally refer to the different switches (e.g., circuit and/or soft switches) used to find and/or connect a client to a desired target within the networks 108 and/or RAN 101. They may also comprise gateway interfaces and any other server apparatuses for performing desired connectivity.

The RAN 101 includes base stations (BS) 102. They are coupled to radio network controllers 104 for controlling client access through the RAN, and ultimately, to one or more of the networks 108 or to another wireless client in the RAN. In a general sense, the base stations may comprise RNC functionality, depending on particular architectures.

The base stations provide an air interface for transmitting and receiving signals with mobile stations. The base stations may also be coupled between each other, e.g., wirelessly or through cable connections. In many embodiments, they facilitate functions such as modulation/demodulation and depending on the utilized wireless communications scheme, physical channel coding, micro diversity, error handling, and/or closed loop power control. The controllers 104 may function to control radio resources and admission, allocate channels, control power settings, control handover, and/or control macro diversity, ciphering, segmentation/reassembly, broadcast signaling, and open loop power control. Again, they may or may not be part of a base station, e.g., there may be a controller serving more than one base station or each station may comprise its own controller.

The RAN 101 corresponds generally to a cellular RAN for a given wireless operator (e.g., Verizon™, AT&T™, and Sprint™), but as used herein, it may also encompass other types of access networks, depending, among other things, on characteristics of the wireless operator and wireless client such as how the network is configured, the type of wireless client, where it is, and the like. For example, it may encompass local area networks such as WiFi networks and the like that may be accessible to a wireless client. It may also comprise other or at least portions of other operator access networks such as when roaming is available.

Transmission of data from within the RAN 101 to a mobile station (MS) may proceed in the following manner. Data such as voice data, IP packets or Ethernet frames may be encapsulated in an appropriate format (e.g., WiMax or LTE data frame format) and forwarded from a network 108 to an appropriate base station, e.g., the "serving" base station, within a given cell. The serving base station then transmits the data to the MS using a unidirectional wireless link, which may be referred to as a "downlink" (or forward link). Transmission of data from the MS to a network destination proceeds in the reverse direction. In this case, the encapsulated data is transmitted from the mobile station to its serving base station, typically using a unidirectional wireless link referred to as an "uplink" (or forward link). After passing through the network controller, the data packets are forwarded through an appropriate switch, converted to an appropriate format, e.g., IP Packets or Ethernet frames, and transmitted henceforth to the desired destination.

While the inventive principles presented herein may be employed with various different mobile wireless standards, they are particularly useful in systems employing orthogonal frequency division multi-access (OFDMA). For ease of understanding, as well as for brevity, henceforth, inventive principles will primarily be described in cooperation with the IEEE 802.16m (also referred to as Mobile WiMax) standard, as an illustrative example, but it should be appreciated that such principles may, and in many cases likely will, work in communication systems employing other standards.

Figure 2:
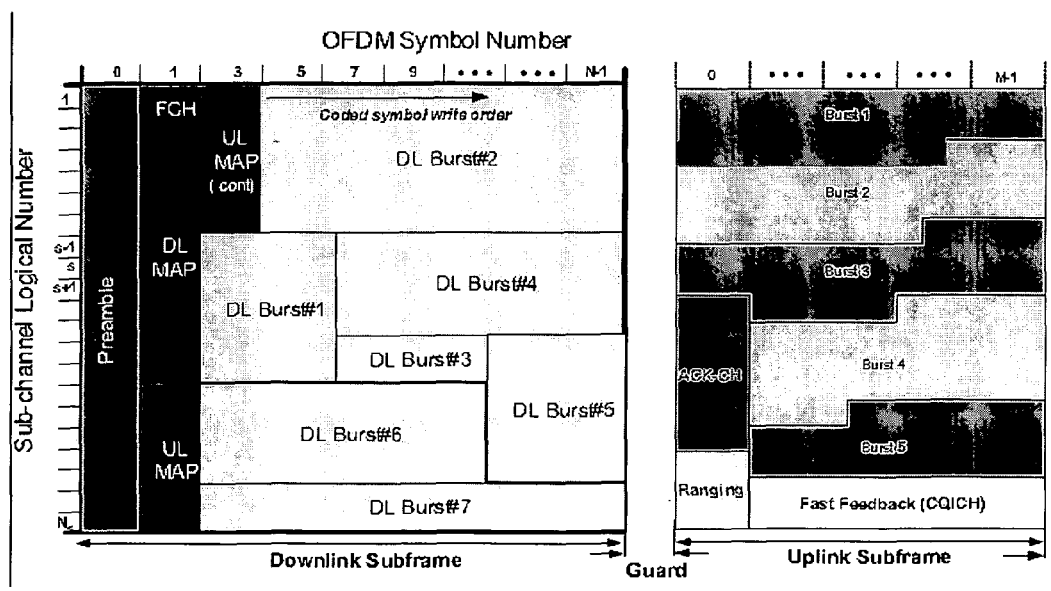
FIG. 2 is an exemplary-frame structure for an OFDMA frame.

FIG. 2 shows a structure for an OFDMA communications frame (WiMax in this example). Of primary relevance to this disclosure, a fast feedback channel (CQICH, also referred to as FBCH herein) is included in uplink sub frames. (Note that in the drawing, its identified as CQICH, but it should be appreciated that information, e.g., MIMO and other control information, in addition to channel quality information, may be included in a fast feedback channel.

In some embodiments, the fast feedback channel carries channel quality feedback and MIMO feedback information. In some embodiments, the fast feedback channel starts at a pre-determined location, e.g., with its size defined in a DL broadcast control message. Fast feedback allocations can be periodic and may be configurable. There may be two types of UL fast feedback control channels: a primary fast feedback channel (PFBCH) and a secondary fast feedback channels (SFBCH). (For additional information regarding the use of primary and secondary fast feedback channels, see co-pending U.S. patent application Ser. No. 12/459,006 titled: APPARATUS AND METHODS FOR EFFICIENT IMPLEMENTATION OF TUNERS, filed on Jun. 24, 2009 and incorporated by reference herein.)

In wireless systems, the DL transmission will typically support multiple modes. The ability for an MS and BS to be able to adaptively switch among the transmission modes according to MS' channel and traffic conditions is important to optimize the DL performance to achieve the required capacity targets. A fast feedback channel is used to feed back channel quality information, as well as MIMO (multi-input-multi-output) information, to support DL adaptation. (Note that embodiments may excel in MIMO implementations but work in a variety of applications, e.g., one transmit antenna at MS and multiple antennas at BS, 2×2 or 2×4 MIMO in UL. Channel Quality Indicator (CQI) is a measurement of the communication quality of wireless channels. CQI can be a value (or values) representing a measure of channel quality for a given channel. Typically, a high value CQI is indicative of a channel with high quality and vice versa. A CQI for a channel can be computed by making use of performance metrics, such as a signal-to-noise ratio (SNR), signal-to-interference plus noise ratio (SINR), signal-to-noise plus distortion ratio (SNDR), and so forth of the channel. These values and others can be measured for a given channel and then used to compute a CQI for the channel.

The primary fast feedback channel (PFBCH) is generally used to carry 4-6 bits of information, providing wideband channel quality feedback and MIMO feedback. It may be used to support robust feedback reports.

Figure 3:
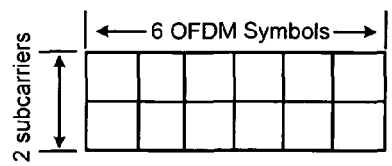
FIG. 3 shows a feedback mini tile (FMT) for a primary feedback channel (PFBCH) in accordance with some embodiments.
Figure 4:
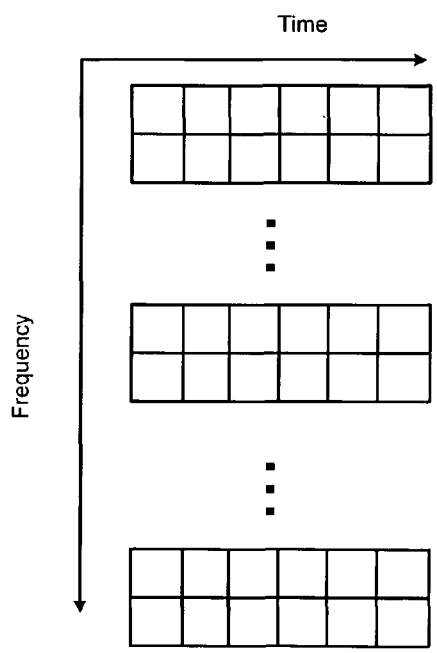
FIG. 4 shows a PFBCH transmission including three distributed 2×6 FMTs in accordance with some embodiments.
Figure 5:
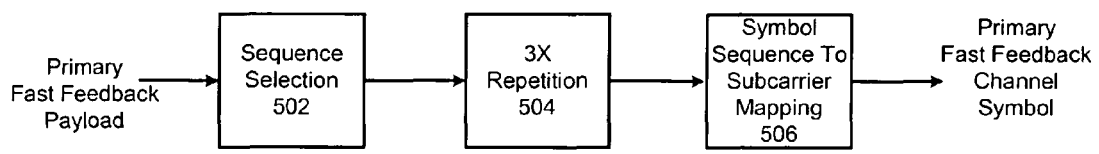
FIG. 5 is a block diagram showing a flow for mapping information into a PFBCH in accordance with some embodiments.

With reference to FIGS. 3 and 4 and the tables in FIGS. 6 to 8, an approach for orthogonal coding for primary fast feedback channels is presented. With this approach, 4-6 bits of information are fed back in a fast feedback message to a base station. With reference to FIGS. 3 and 4, a tile structure for a PFBCH message is described. A tile size of 2 continuous subcarriers by 6 OFDM symbols (2×6) may be employed, with each logical channel of PFBCH constituting 3 tiles of 2×6 (FIG. 4). As indicated, the PFBCH structure comprises 3 tiles, which may be chosen from different UL DRUB for frequency diversity as shown in FIG. 4. Each PFBCH carries 4 to 6 information bits. The symbol generation procedure is shown in FIG. 5, with non-coherent detection being used at the receiver side (although coherent detection could also be employed).

A. Orthogonal Sequence for PFBCH

Unified coding may be used for orthogonal sequencing of a primary feedback channel. In some embodiments, an orthogonal sequence for transmitting 4 and 5 bits of information as a subset of a 64 orthogonal sequence is used in a 6 bit transmission.

The table of FIGS. 6A and 6B shows a unified semi-orthogonal sequence for a primary feedback channel quality indicator (PCQICH) when using a feedback mini tile (FMT) size of 2×6. The cross-correlation of these sequences is less than 3.86. This can support transmitting up to 6 information bits. When transmitting 4 bits, 16 sequences (FIG. 7) can be used, and when transmitting 5 bits, 32 sequences (FIG. 8) can be used.

Dedicated PFBCH coding may also be employed. Different semi-orthogonal sequences for different information bits may be used to attain improved performance for the information bits. The table of FIG. 7 shows a semi-orthogonal sequence for transmitting 4 bits of information. Likewise, the table of FIG. 8 shows a semi-orthogonal sequence for transmitting 5 bits of information. In practical systems, sequences in the tables of FIGS. 6 to 8 may be put together to form one table of size 112×12, where the first 16 codeword is from the FIG. 7 table, then followed by the 32 codeword from the FIG. 8 table with the final 64 codeword being from the FIG. 6 table. A corresponding codeword may be chosen, depending on how many information bits are to be transmitted.

(It should be appreciated that complex sequences supporting 4/5/6 bit transmissions are not limited to specific tile configurations as set forth herein, with the presented examples. For example, they are not only suitable for tile sizes of 2 contiguous symbols by 6 sub-carriers. Rather, they would be suitable for any tile size that could accommodate a sequence length of 12. For example, tile sizes of 2×6, 6×2, 3×4, 4×3, etc. would be suitable. Additionally, the tile-subcarrier product need not have to correspond to the sequence length. For example, with a sequence length of 12, a tile size of 2×7 would also suffice if 2 subcarriers are arranged as pilots and perform pilot assisted non-coherent detection. Accordingly, sequences can be applied to various different tile sizes.)

B. Codeword Mapping Across Tiles

In the prior art, the codeword for each message is typically repeated in all the tiles in one logical channel of a PFBCH. Unfortunately, this can cause detection problems for high mobility. Accordingly, a novel approach is hereby presented whereby each message is mapped to a group of codewords or code sequences, with each of the codewords put to one tile of the logical CQI channel (CQICH) in the PFBCH. This reduces (if not removes) the error floor when direct cross correlation is applied for detecting the message. Taking 6 bits of payload and three tiles per PCQICH with a tile size of 2×6 as an example, we have 64 sequences with indexing Idx=[1, 2,3, ... 64] with each index corresponding to a 6-bit message.

For three tiles per PCQICH, the code sequence index of each tile can be represented as below:

1) 1$^{st}$ tile: $Idx_1=[a_1^1, a_2^1, a_3^1, \ldots a_{64}^1]$
2) 2$^{nd}$ tile: $Idx_2=[a_1^2, a_2^2, a_3^2, \ldots a_{64}^2]$
3) 3$^{rd}$ tile: $Idx_3=[a_1^3, a_2^3, a_3^3, \ldots a_{64}^3]$ (Where $^i a_j (i=1, 2, 3; j=1, 2 \ldots 64) \in \{1, 2, \ldots 64\}$; i is the tile index; j is the message index; and a is the sequence index for the j-th message at i-th tile. For each message j, $a_j^1, a_j^2, a_j^3$ can be different.)

With this mapping, performance of the PFBCH can be improved effectively in high speed scenarios when using a tile size of 2×6. Without loss of generality, index mapping shown below may be used:

1) $Idx_0=[1, 2, 3, \ldots 64]$
2) $Idx_1$: $a_j^1=\mod(j+21, 64)$, $(j=1, 2, 3, \ldots 64)$
3) $Idx_2$: $a_j^2=\mod(j+42, 64)$, $(j=1, 2, 3, \ldots 64)$ It has been observed that using different code words for the same message at different tiles can improve the performance at both PER=0.1 and 0.01, which are the typical design targets, e.g., for the fast feedback channels in both 802.1 6m and LTE. Also, this approach may outperform that of doing permutations among subcarriers of one tile (e.g., proposed by LGe).

The invention is not limited to the embodiments described, but can be practiced with modification and alteration within the spirit and scope of the appended claims. For example, it should be appreciated that the present invention is applicable for use with all types of mobile devices. Examples include but are not limited to personal computers, cellular phones, so-called smart phones, and the like. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details are set forth in order to describe example embodiments of the invention, it should be apparent to one skilled in the art that the invention can be practiced without, or with variation of, these specific details. The description is thus to be regarded as illustrative instead of limiting.

What is claimed is:

1. A method, comprising:
   in a mobile station, conveying in an uplink fast feedback information using different code sequences for different tiles in one primary fast feedback channel (PFBCH) in which the tiles comprise m contiguous symbols by n sub-carriers, wherein the product of m and n corresponds to a desired sequence length,
   wherein the tiles are to convey 6 bits of information and code sequences are used with correlation distances of less than 3.86.

2. A method, comprising:
   in a mobile station, conveying in an uplink fast feedback information using different code sequences for different tiles in one primary fast feedback channel (PFBCH) in which the tiles comprise m contiguous symbols by n sub-carriers, wherein the product of m and n corresponds to a desired sequence length,
   wherein the tiles are to convey 5 bits of information and code sequences are used with correlation distances of less than 3.12.

3. A method, comprising:
   in a mobile station, conveying in an uplink fast feedback information using different code sequences for different tiles in one primary fast feedback channel (PFBCH) in which the tiles comprise in contiguous symbols by n sub-carriers, wherein the product of m and n corresponds to a desired sequence length,
   wherein the tiles are to convey 4 bits of information and code sequences are used with correlation distances of less than 1.95.

* * * * *

UNITED STATES PATENT AND TRADEMARK OFFICE
CERTIFICATE OF CORRECTION

PATENT NO. : 8,462,713 B2
APPLICATION NO. : 12/658337
DATED : June 11, 2013
INVENTOR(S) : Sun et al.

Page 1 of 1

It is certified that error appears in the above-identified patent and that said Letters Patent is hereby corrected as shown below:

In the Claims:

In column 6, line 31, in claim 3, delete "in" and insert --m--, therefor

Signed and Sealed this
Nineteenth Day of November, 2013

Teresa Stanek Rea
*Deputy Director of the United States Patent and Trademark Office*